Oct. 27, 1964 A. A. JORGENSEN 3,154,643
LINE CIRCUIT
Filed June 5, 1961
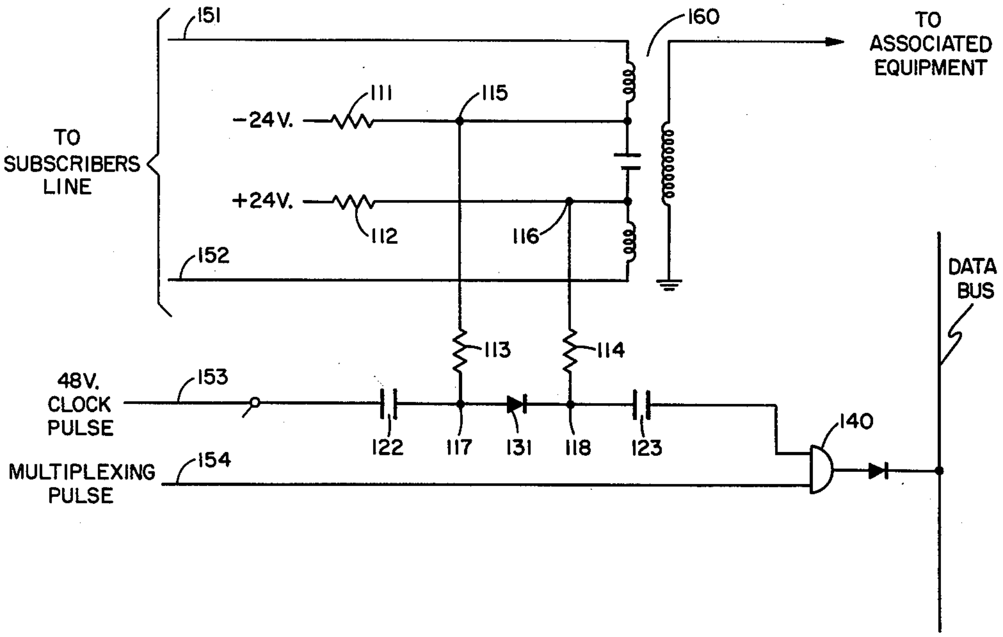
INVENTOR.
ADAM A. JORGENSEN
BY
George W. Killian
AGENT United States Patent Office 3,154,643
Patented Oct. 27, 1964

3,154,643
LINE CIRCUIT

Adam A. Jorgensen, Victor, N.Y., assignor to General Dynamics Corporation, Rochester, N.Y., a corporation of Delaware Filed June 5, 1961, Ser. No. 114,714
3 Claims. (Cl. 179—18)

This invention relates in general to a signaling circuit and, more particularly, to a time division multiplex signaling circuit.

Although the invention herein disclosed is suitable for more general application, the illustrated embodiment is particularly well adapted for use in the line circuit of a time division multiplex telephone switching system. In such telephone systems it is necessary to couple multiplexing signals to a data highway indicative of the on- or off-hook character of the associated telephone instrument. The on- or off-hook character of the line is conventionally indicated by the magnitude of the D.C. current flowing in the subscriber's line loop. Various means have been proposed for responding to the D.C. loop current but, until the present, they have exhibited handicaps which have prevented their universal acceptance in time division multiplex systems.

Line circuits employing a balanced diode gate circuit have been proposed in the prior art. However, such circuits would only function over a loop of very limited resistance; or, if modified to extend the range, the circuit required excessive standby power.

Accordingly, it is the general object of this invention to provide a new and improved signaling circuit for use in a time division signaling system.

It is another object of this invention to provide a solid state line circuit for use in a time division multiplex telephone system.

It is a more particular object of this invention to provide a solid state line circuit for use in a time division multiplex telephone system which operates over an extended range of line loop resistance and which requires no standby power.

It is another object of this invention to provide a balanced diode gate type line circuit for use in a time division multiplex telephone system.

It is another object of this invention to provide new and improved means for gating a relatively low amplitude multiplexing pulse to a data bus in response to a change in the magnitude of a D.C. current in a control circuit.

Further objects and advantages of the invention will become apparent as the following description proceeds, and features of novelty which characterize the invention will be pointed out in particularity in the claims annexed to and forming a part of this specification.

A complete understanding of the invention may be obtained by making reference to the following specification and the accompanying drawing which illustrates the essential circuit details of a time division multiplex telephone system line circuit which incorporates the present invention.

It is to be understood that only the details of the circuit necessary for a complete understanding of the invention have been shown. For example, the drawing illustrates the essential details of a line circuit in a time division multiplex telephone system but does not illustrate the means for generating the multiplexing pulses, the details of the telephone instrument connected to the line circuit, or the means for applying a ringing signal to the line.

As is well known, a telephone instrument includes a dial which, in response to an operation thereof, produces a number of pulses or circuit interruptions, corresponding to the value of the digit dialed. The dial is caused to interrupt the flow of direct current to the instrument. Accordingly, the central office telephone equipment must include some means for detecting and responding to the momentary interruptions of current for proper interpretation of the dialed digits. In the widely used electromechanical systems, a D.C. relay is included in the circuit to repeat the dial pulses to cause the associated equipment to function in the desired manner. However, in electronic telephone systems, the use of relays in line circuits is considered undesirable because of their cost, weight, size and maintenance requirements in relation to the other components used in the system. Therefore, the circuit of the present invention is well adapted for use in time division multiplex telephone systems as it produces the type of output signal required while using a minimum number of lightweight and inexpensive elements which have no moving parts and therefore require no routine adjustment.

It is believed that the operation of the present invention, when incorporated in a time division multiplex telephone system, may best be understood by considering the circuit of the accompanying drawing. Conductors 151 and 152 connect to a subscriber's line that is terminated with a conventional telephone instrument which includes a dial for producing controlled current interruptions. When the subscriber's telephone, not shown, is off-hook, a current will flow from the +24 volt potential through resistor 112, the lower left-hand winding of line transformer 160, line 152, the telephone instrument including the normally closed dial contacts, line 151, the upper left-hand winding of line transformer 160, and resistor 111 to the −24 volt potential. The magnitude of the current which flows is, of course, dependent upon the size and length of lines 151 and 152, which determines the distributed resistance. If lines 151 and 152 have very little resistance, then the terminals designated 115 and 116 will be at nearly the same potential when the subscriber's telephone is off-hook. The line current will decrease with longer lines and as the line current decreases, the potential drop across resistors 111 and 112 will be reduced and the terminals designated 115 and 116 will become more negative and positive, respectively. Finally, if the subscriber's line is open circuited and no current flows, it will be apparent that terminals 115 and 116 assume potentials of −24 volts and +24 volts, respectively.

When no current is flowing in line conductors 151 and 152, the terminals designated 117 and 118 will be at −24 volts and +24 volts, respectively. It is apparent that under the named conditions, the positive 24 volt and negative 24 volt potential sources provide a back bias to diode 131. A pulse applied to lead 153 will be transmitted through capacitor 122, diode 131, and capacitor 123 only if the amplitude of the input pulse is of sufficient magnitude to overcome the back bias applied to diode 131.

Circuits of the prior art have suggested the circuit of the present invention as thus far described. However, the prior art circuits have proposed that the multiplexing pulse be applied to the equivalent of lead 153. Such prior art circuits functioned perfectly but over such a limited range of subscriber's loop resistance as to preclude satisfactor use as a line circuit. The limited range of operability came about as the result of circumstances beyond the control of the circuit designers. In the telephone switching art, it was desirable to have the subscriber's line terminate at a 48 volt potential source, thereby providing a back bias to the idode of 48 volts when no current flows in the subscriber's loop; and because of economic considerations, it was not practical to generate multiplexing pulses having an amplitude greater than approximately 10 volts. Accordingly, no multiplexing pulses could be gated through the diode gate circuit of the prior art until the subscriber's loop current became large enough to reduce the back bias of the diode, corresponding to diode 131 of the drawing, to less than the approximately 10 volts of the multiplexing pulse. Since it is desired to extend subscribers' loops to at least two thousand ohms, the prior art balanced diode line circuits proved entirely unsatisfactory.

It is immediately evident that providing multiplexing pulses having an amplitude of increased magnitude would extend the range of operability of the circuit. However, such a solution, although theoretically entirely satisfactory, is impractical in a commercil system due to the prohibitive cost of amplifying each multiplexing pulse.

Another solution was offered which provided means for extending the range of operability but required so much standby power that the solution had to be abandoned on economic grounds.

The present invention provides a solution to the problem which permits the extension of the subscriber's loop to the desired limits and which does no require such costly auxiliary equipment as to make the solution economically impractical.

The time division multiplex signaling circuit of the present invention employs a source of clock pulses having a potential amplitude approximately equal to the maximum back bias potential that may be applied to diode 131. While relatively expensive equipment is required to produce the desired high potential clock pulse, the total expense is negligible when prorated among the plurality of signaling circuits it serves, since the clock pulse is multipled to all the signaling circuits. Satisfactory means for generating relatively high potential clock pulses are well known in the art and, therefore, the details are not shown herein as the inclusion thereof would only tend to obscure or mask the invention. Thus, let it suffice to say that a clock pulse having a potential approximately equal to the maximum back biasing potential of diode 131 is provided and that the source applies a pulse in each time slot to the lead corresponding to lead 153 in each of the signaling circuits.

By the described means, it is possible to pass a signal from the source of clock pulses through diode 131 in each time slot wherein the back bias on diode 131 is less than the potential of the pulses from the source of clock pulses.

In order to prevent clock pulses from passing a signal through diode 131 when there is no line current it is necessary to provide means for preventing the potential of the clock pulse from exceeding the maximum back biasing potential. This may be accomplished by clamping the voltages together by any suitable means so that any variation in one potential is instantaneously reflected in the other. In addition, it is necessary to prevent passage of clock pulses through the diode as a result of the back bias on the diode 131 being reduced below the theoretical maximum as a result of leakage current between lines 151 and 152. This refinement may be accomplished by modifying the circuit which clamps the potentials together in such a manner that the clock pulse potential is appropriately reduced below the theoretical maximum back biasing potential.

As has been shown, the back bias on diode 131 is controlled by the magnitude of the current in line conductors 151 and 152 and, therefore, clock pulses will be gated through diode 131 only when the line current exceeds a predetermined minimum, and the clock pulses will be cut off when the line current is less than the predetermined minimum. In a telephone system, the subscriber's loop is alternately opened and reclosed during dialing and, therefore, the dial can be used to selectively control the passage of bursts of time slot pulses through diode 131. However, for direct utility in typical time division multiplex systems, it is necessary to eliminate all the clock pulses from the group passed through diode 131, except the specific ones in the time slot assigned to the particular line. The coupling of the specific signal per time frame, from the group of successive time slot signals passed through diode 131 in response to the closed loop condition, is accomplished by means of AND gate 140 which gates a signal therethrough only when a clock pulse on lead 153 is passed through diode 131 conjointly with the application of a multiplexing signal to lead 154. Means for cyclically generating multiplexing signals and applying them to appropriate leads in the desired time slots are well known in the time division multiplexing art and, therefore, are not shown here.

In summary, there has been shown and described an economical means for selectively coupling a relatively low potential multiplexing signal to a data bus in a predetermined time slot in response to the flow of current, from a constant and relatively high potential source, through a control circuit even though the current in the control circuit may vary over a wide range of values.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a time division multiplex signaling system, a source of clock pulses, each pulse from said source of clock pulses having a given amplitude and occurring in each time slot of a repetitive time frame, a source of multiplexing pulses, each pulse from said source of multiplexing pulses occurring in a given time slot of said repetitive time frame, and AND gate, first means for connecting said multiplexing pulses as a first input to said AND gate, second means including a serially connected diode for connecting said clock pulses as a second input to said AND gate, a two-conductor signaling circuit for transmitting first and second signals, the conductors of said signaling circuit terminating at opposite terminals of a potential source having a magnitude at least as great as said given amplitude, and means connecting said signaling conductors to said diode for back biasing said diode with a direct current potential having a magnitude at least as great as said given amplitude when said signaling circuit is transmitting said first signal, and for back biasing said diode with a direct current potential having a magnitude less than said given amplitude when said signaling circuit is transmitting said second signal.

2. The combination set forth in claim 1 wherein said two-conductor signaling circuit comprises a subscriber's line in a telephone system and said first and second transmitted signals are created in response to said subscriber's line being open circuited and short circuited, respectively.

3. The combination set forth in claim 2 wherein said first and second signals may be selectively transmitted over said two-conductor line.

References Cited in the file of this patent

UNITED STATES PATENTS 2,968,697 Rager ---------------- Jan. 17, 1961

OTHER REFERENCES

Goudet: "A 240-Line Fully Electronic Switchboard," AIEE Transactions Paper No. 60–233, February 5, 1960, pp. 8, 9, and Figure 10 (on page 19) relied on.